(12) United States Patent
Liu

(10) Patent No.: US 12,275,006 B2
(45) Date of Patent: Apr. 15, 2025

(54) SOLID-LIQUID PHASE REACTOR FOR PREPARING POWDER PRODUCT

(71) Applicant: Li Liu, Ningbo (CN)

(72) Inventor: Li Liu, Ningbo (CN)

(73) Assignee: Li Liu, Ningbo (CN)

( * ) Notice: Subject to any disclaimer, the term of this patent is extended or adjusted under 35 U.S.C. 154(b) by 149 days.

(21) Appl. No.: 17/890,064

(22) Filed: Aug. 17, 2022

(65) Prior Publication Data

US 2023/0173446 A1 Jun. 8, 2023

(30) Foreign Application Priority Data

Aug. 17, 2021 (CN) .......................... 202121925517.3

(51) Int. Cl.
| | | |
|---|---|---|
| B01J 8/16 | (2006.01) | |
| B01J 8/00 | (2006.01) | |
| B01J 8/02 | (2006.01) | |
| B01J 8/04 | (2006.01) | |
| B01J 19/10 | (2006.01) | |

(52) U.S. Cl.
CPC .................. *B01J 8/16* (2013.01); *B01J 8/001* (2013.01); *B01J 8/0035* (2013.01); *B01J 8/008* (2013.01); *B01J 8/0292* (2013.01); *B01J 8/0492* (2013.01); *B01J 8/0496* (2013.01); *B01J 19/10* (2013.01); *B01J 2208/00592* (2013.01); *B01J 2208/00628* (2013.01); *B01J 2208/00752* (2013.01); *B01J 2208/00884* (2013.01)

(58) Field of Classification Search
None
See application file for complete search history.

(56) References Cited

U.S. PATENT DOCUMENTS

| | | | | |
|---|---|---|---|---|
| 3,720,306 A | * | 3/1973 | Hedler | H01J 9/22 |
| | | | | 209/269 |
| 4,783,266 A | * | 11/1988 | Titch | B03C 1/0332 |
| | | | | 210/695 |
| 2015/0021238 A1 | * | 1/2015 | Gandhi | B07B 1/06 |
| | | | | 209/235 |

FOREIGN PATENT DOCUMENTS

| | | | | | |
|---|---|---|---|---|---|
| CN | 107715821 A | * | 2/2018 | | |
| CN | 108746173 A | * | 11/2018 | ............... | B07B 1/04 |
| NL | 8103750 A | * | 3/1983 | ............. | B01D 29/01 |
| WO | WO-2012109230 A2 | * | 8/2012 | ............. | B01D 33/06 |

\* cited by examiner

*Primary Examiner* — Jennifer A Leung

(57) ABSTRACT

The present disclosure relates to the field of reactor technologies and in particular to a solid-liquid phase reactor for preparing a powder product, which includes a vessel shell, a material-restricting partition net, a solid reactant charge opening, and a reaction solution make-up opening. The material-restricting partition net is disposed in a cavity of the vessel shell and connected to the vessel shell. The material-restricting partition net is enclosed to form a semi-closed material-restricting zone with an upward-facing opening itself or together with an inner wall of a vessel. A frame of the semi-closed material-restricting zone is rigid. The solid reactant charge opening is in communication with the facing-up opening of the semi-closed material-restricting zone, and the reaction solution make-up opening is in communication with an internal space of the semi-closed material-restricting zone.

15 Claims, 2 Drawing Sheets

SOLID-LIQUID PHASE REACTOR FOR PREPARING POWDER PRODUCT

CROSS-REFERENCE TO RELATED APPLICATION

This application claims priority from the Chinese patent application 202121925517.3 filed Aug. 17, 2021, the content of which is incorporated herein in the entirety by reference.

TECHNICAL FIELD

The present disclosure relates to the field of reactor technologies, and in particular to a solid-liquid phase reactor for preparing a power product.

BACKGROUND

Based on substance state, a preparation method of a powder material includes a solid phase method, a liquid phase method and a gas phase method. The solid phase method mainly includes a mechanical pulverization method, an ultrasonic pulverization method, a thermal decomposition method, an explosion method and the like, which are used to crush large granules into small granules from top down. The liquid phase method mainly includes a precipitation method, an alkoxide method, a carbonyl method, a spray and heat drying method, a freeze-drying method, an electrolysis method, a chemical condensation method and the like, which are used to separate out a solid powder material from a soluble salt through liquid phase chemical reaction. The gas phase method mainly includes a gas phase reaction method, a plasma method, a high temperature plasma method, an evaporation method, a chemical vapor deposit method and the like, which are used to obtain a solid material by gas phase reaction or deposition method. Although the powder material can be prepared by many methods as mentioned above, each method has its own limitation. For example, the liquid phase method has the disadvantages of low production, high cost, complex process and the like. The mechanical method has the disadvantages that the obtained powders are difficult to grade and the purity, fineness and morphology of the products cannot be guaranteed, etc. Currently, the rotating electrode method and the gas atomization method are the major methods for preparing a high performance metal and an alloy powder, but these methods have low production efficiency, low yield of ultrafine powder and large energy consumption. The jet mill method and the hydrogenation and dehydrogenation method are applicable to large-batch industrial production but have strong selectivity for raw metals and alloys. Therefore, it is very significant to develop a new preparation technology for a powder material and a device implementing the technology.

SUMMARY

Based on this, in order to address the above technical problems, the present disclosure provides a solid-liquid phase reactor using a non-soluble solid material and a reaction solution for reaction, where, by controllable reaction of a solid reactant and a reaction solution in the reactor, a controllable device of a finer non-soluble powder product material is implemented.

The present disclosure provides a solid-liquid phase reactor for preparing a powder product, including a vessel shell, a material-restricting partition net, a solid reactant charge opening, and a reaction solution make-up opening. The material-restricting partition net is disposed in a cavity of the vessel shell and connected or fixed to the vessel shell; the material-restricting partition net is enclosed to form a semi-closed material-restricting zone with an upward-facing opening itself or together with an inner wall of a vessel; an average particle size of a solid reactant>a hole diameter of the holes of the material-restricting partition net>a particle size of a reaction powder product; a frame of the semi-closed material-restricting zone is rigid; the solid reactant charge opening is in communication with the facing-up opening of the semi-closed material-restricting zone, and the reaction solution make-up opening is in communication with an internal space of the semi-closed material-restricting zone.

The solid reactant may be in a shape of granule, ribbon, slice, thread or flake. If a size of the solid reactant in at least one of three dimensional directions is obviously greater than the hole size of the holes of the material-restricting partition net to disable the solid reactant to run through the holes of the material-restricting partition net freely and easily, it is thought that the average particle size of the solid reactant is greater than the hole size of the holes of the material-restricting partition net.

Furthermore, when the solid-liquid phase reactor does not include a vessel lid, the vessel shell includes a vessel body; when the solid-liquid phase reactor includes a vessel lid, the vessel shell includes a vessel body and a vessel lid.

When the material-restricting partition net is enclosed to form the semi-closed material-restricting zone with an upward-facing opening itself or together with the inner wall of the vessel, the material-restricting partition net needs to bend and deform to form the semi-closed material-restricting zone with an upward-facing opening.

The rigid frame of the material-restricting partition net ensures a shape of the semi-closed material-restricting zone is substantially fixed. When the frame of the material-restricting partition net is rigid, the shape of the semi-closed material-restricting zone is substantially determined by the frame. At this time, a net surface of the material-restricting partition net may be rigid or non-rigid.

The semi-closed material-restricting zone with an upward-facing opening refers to that the semi-closed material-restricting zone may receive a solid reactant from the solid reactant charge opening through the facing-up opening. Regardless of whether a top cover is disposed additionally on the semi-closed material-restricting zone, the semi-closed material-restricting zone is thought of as a semi-closed material-restricting zone with an upward-facing opening as long as the top cover needs to be opened when the facing-up opening receives a solid reactant from the solid reactant charge opening.

The solid reactant which is charged by the solid reactant charge opening and unable to run through the holes of the material-restricting partition net is restricted within the semi-closed material-restricting zone.

During a reaction process, a liquid level position is higher than a bottom position of the semi-closed material-restricting zone to ensure the solid reactant charged into the semi-closed material-restricting zone can be in contact with the reaction solution for reaction.

During a reaction process, the reaction solution of a given volume is filled in the semi-closed material-restricting zone, and the reaction solution can enter or leave the semi-closed material-restricting zone through the holes of the material-restricting partition net.

Furthermore, the reaction solution is formed by an acid solute or an alkali solute and a solvent, and a concentration of the reaction solution refers to a concentration of the acid solute or the alkali solute in the reaction solution.

Furthermore, the solid reactant may be an alloy powder, an alloy ribbon, an alloy slice, an alloy thread or an alloy flake.

The reaction solution make-up opening is in communication with the internal space of the semi-closed material-restricting zone, which ensures the concentration of the reaction solution newly injected into the semi-closed material-restricting zone is higher than the concentration of the reaction solution outside the semi-closed material-restricting zone. Because the reaction solution outside the semi-closed material-restricting zone is the reaction solution which undergoes partial reaction and runs through the material-restricting partition net through liquid convection, its concentration is necessarily lower than the concentration of the newly-injected reaction solution.

Furthermore, the solid-liquid phase reactor includes an outlet which is in communication with an internal space of the vessel outside the semi-closed material-restricting zone and located at the bottom of the vessel or close to the bottom of the vessel.

Furthermore, the material-restricting partition net is in the form of multiple layers, and enclosed to form a canning type multi-level material-restricting zone itself or together with the inner wall of the vessel. An innermost layer of material-restricting zone is a semi-closed material-restricting zone with an upward-facing opening, and other layers of material-restricting zones are semi-closed material-restricting zones with an upward-facing opening or closed material-restricting zones without opening.

The canning type refers to that an outer layer wraps an inner layer such that one layer is sleeved on another layer. The canning type does not require that each layer should have a same shape as long as the canning structure can be achieved.

The innermost layer of material-restricting zone is a semi-closed material-restricting zone with an upward-facing opening. Since other material-restricting zones than the innermost layer of material-restricting zone is not in communication with the solid reactant charge opening, the other material-restricting zones may be semi-closed material-restricting zones with an upward-facing opening or closed material-restricting zones without opening.

Furthermore, the multi-level material-restricting zone is increased in capacity for external addition of one layer; an inter-net average distance of different layers of material-restricting partition nets exceeds 5 mm, and a more outer layer of material-restricting partition net has holes with a smaller hole diameter; the solid reactant charge opening is in communication with the facing-up opening of the innermost layer of semi-closed material-restricting zone, and the reaction solution make-up opening is in communication with an internal space of the innermost layer of semi-closed material-restricting zone.

By disposing the multi-level semi-closed material-restricting zone, the reaction of solid intermediate products of different particle sizes can be controlled by using the material-restricting partition nets having holes of different hole sizes. The solid reactant or intermediate product of the innermost layer of semi-closed material-restricting zone has the largest particle size; the more outer layer of partition net has holes of smaller hole sizes, and the solid reactant or solid intermediate product of the next level of semi-closed material-restricting zone has a smaller particle size. Thus, the solid intermediate product of the outermost layer of semi-closed material-restricting zone has the smallest particle size. Based on the fact that the concentration of the reaction solution decreases gradually from the innermost layer to the outermost layer, the design can achieve the followings: the concentration of the reaction solution is higher where the solid reactant or solid intermediate product has a larger particle size; and the concentration of the reaction solution is lower where the solid intermediate product has a smaller particle size.

Furthermore, the vessel shell includes a vessel body and a sealing vessel lid, and a reaction gas by-product collection channel penetrating through the vessel shell is disposed above a highest liquid level of the vessel shell. After the vessel shell includes the sealing vessel lid, its internal space is divided into a space full of reaction solution and a space above the liquid level. A gas generated by solid-liquid reaction will be gathered in the space above the liquid level. Therefore, disposal of the reaction gas by-product collection channel penetrating through the vessel shell above the highest liquid level of the vessel shell can realize collection of the gas by-product.

Furthermore, the reaction solution make-up opening and the solid reactant charge opening are commonly used, that is, reaction solution make-up is performed through the solid reactant charge opening.

Furthermore, a ratio of a capacity of the semi-closed material-restricting zone to a capacity of the internal space of the cavity of the vessel shell is 0.2% to 25%, and the capacity of the semi-closed material-restricting zone is greater than 2 L.

Furthermore, the semi-closed material-restricting zone is formed by the following enclosing manners: the semi-closed material-restricting zone is enclosed by the material-restricting partition net and rigidly connected with the inner wall of the reaction vessel shell, or by the material-restricting partition net and one planar inner wall of the reaction vessel, or by the material-restricting partition net and two planar inner walls of the reaction vessel, or by the material-restricting partition net and three planar inner walls of the reaction vessel, or by the material-restricting partition net and four planar inner walls of the reaction vessel, or by the material-restricting partition net and one curved inner wall of the reaction vessel.

Enclosing by the material-restricting partition net and rigidly connecting with the inner wall of the reaction vessel shell refers to that the semi-closed material-restricting zone is enclosed by the material-restricting partition net and then is fixedly connected to the vessel shell by a rigid frame.

When the reaction vessel is a square cabinet shape, the semi-closed material-restricting zone is enclosed by the material-restricting partition net and one vessel inner wall, that is, enclosed by the material-restricting partition net and one planar inner wall of the reaction vessel.

When the reaction vessel is in a shape of square cabinet, the semi-closed material-restricting zone is enclosed by the material-restricting partition net, one edge of the square cabinet, and two vessel inner walls connected to the one edge, that is, enclosed by the material-restricting partition net and two planar inner walls of the reaction vessel.

When the reaction vessel is in a shape of square cabinet, the semi-closed material-restricting zone is enclosed by the material-restricting partition net, three edges of a bottom corner of the square cabinet, and three vessel inner walls connected to the three edges, that is, enclosed by the material-restricting partition net and three planar inner walls of the reaction vessel.

When the reaction vessel is in a shape of square cabinet, the material-restricting partition net vertically partitions the square cabinet, and the semi-closed material-restricting zone is enclosed by three side inner walls and one bottom inner wall of the vessel, that is, enclosed by the material-restricting partition net and four planar inner walls of the reaction vessel.

When the reaction vessel is in a shape of cylinder or near-sphere, the semi-closed material-restricting zone is enclosed by the material-restricting partition net and one curved inner wall of the reaction vessel.

Furthermore, a space is present between the semi-closed material-restricting zone or the closed material-restricting zone and a bottom of the vessel. When a space is present between the semi-closed material-restricting zone or the closed material-restricting zone and the bottom of the vessel, the solid intermediate product or product capable of running through the material-restricting partition net may not only horizontally run through the partition net but also downwardly run through the partition net under the action of gravity.

Furthermore, the average particle size of the solid reactant>the hole size of the holes of the material-restricting partition net>the particle size of the reaction powder product, and at the same time, 250 μm≥the hole size of the holes of the material-restricting partition net≥2 μm.

When the reaction product has a particle size of nano-level, for example, below 500 nm, since the hole size of the holes of the material-restricting partition net is greater than 2 μm, the partition net also allows the solid intermediate product with a particle size less than 2 μm to run through and at the same time, allows an extremely tiny amount of granules with a particle size less than 2 μm possibly present in the solid reactant to run through.

Based on the designing of the hole size of the holes of the partition net, the material-restricting partition net can function as follows: restricting the solid reactant or solid intermediate product with large and medium particle size to the semi-closed material-restricting zone for reaction, and at the same time, allowing the generated solid intermediate product or product with small particle size to run through the material-restricting partition net to enter a zone outside the semi-closed material-restricting zone for further reaction. The concentration of the reaction solution of the zone outside the semi-closed material-restricting zone is lower than the concentration in the semi-closed material-restricting zone because the reaction solution make-up opening in the semi-closed material-restricting zone performs reaction solution make-up.

The partition net aims to allow reaction to proceed in two zones. In this case, the granules with large and medium particle sizes are reacted in the semi-closed material-restricting zone with high reaction solution concentration whereas the solid reactant, solid intermediate product or product with small particle size runs through the material-restricting partition net into a semi-closed material-restricting zone with low reaction solution concentration or a zone outside the material-restricting zone for further reaction.

Furthermore, 30 μm≥the hole size of the holes of the material-restricting partition net≥2 μm; when the hole size of the holes of the material-restricting partition net is less than or equal to 30 μm, it is suitable for preparing a fine powder or nano-powder product.

Furthermore, 15 μm≥the hole size of the holes of the material-restricting partition net≥2 μm; when the hole size of the holes of the material-restricting partition net is less than or equal to 15 μm, it is suitable for preparing an ultrafine powder or nano-powder product.

Furthermore, the reaction solution make-up opening has a plurality of inlets which are uniformly distributed in the internal space of the semi-closed material-restricting zone. When the reaction solution make-up opening has a plurality of inlets, the positions of which are uniformly distributed in the internal space of the semi-closed material-restricting zone, it can be guaranteed that uniform reaction solution make-up is performed at the positions in the semi-closed material-restricting zone. In this way, the concentration of the reaction solution in the semi-closed material-restricting zone is made uniform as possible.

Furthermore, the plurality of reaction solution make-up openings is shaped like sprinkler.

Furthermore, the solid-liquid phase reactor further includes an ultrasonic generation apparatus. When the ultrasonic generation apparatus is a water bath ultrasonic apparatus, the ultrasonic generation apparatus is disposed below the inner wall of the vessel body; and when the ultrasonic generation apparatus is a probe ultrasonic apparatus, the ultrasonic generation apparatus is disposed on the inner wall of the vessel shell and deep below a liquid level in the cavity of the vessel shell.

Furthermore, the reaction control apparatus includes a water bath ultrasonic apparatus disposed below the inner wall of the vessel body.

The water bath ultrasonic apparatus has four functions: firstly, performing continuous ultrasonic crushing for the reaction intermediate product; secondly, promoting solid-liquid chemical reaction; thirdly, preventing solid granules capable of running through the material-restricting partition net from gathering in the holes of the material-restricting partition net and clogging the holes so as to ensure the solid substance can be distributed in a limited manner as required by design; fourthly, promoting liquid convection.

Furthermore, the material-restricting partition net is connected with the ultrasonic generation apparatus directly or indirectly through a vessel wall. When the material-restricting partition net is connected with the ultrasonic generation apparatus indirectly through a vessel wall, a distance between the material-restricting partition net and the ultrasonic generation apparatus does not exceed a thickness between an outer wall and an inner wall of the vessel. In this case, below the vessel inner wall at a position where material-restricting partition net is fixed is provided with a water bath ultrasonic generation apparatus and the distance between the position where material-restricting partition net is fixed to the vessel inner wall and the ultrasonic generation apparatus is at most a thickness between the outer wall and the inner wall of the vessel.

When the material-restricting partition net is connected with the ultrasonic generation apparatus directly or indirectly through a vessel wall, the material-restricting partition net is enabled to obtain a strong ultrasonic energy as possible. Through ultrasonication, solid granules capable of running through the material-restricting partition net can be prevented from gathering in the holes of the material-restricting partition net and clogging the holes, thus ensuring the solid reactant or intermediate product having different particle sizes can be distributed in a limited manner as required by design.

Furthermore, the reaction control apparatus further includes a probe ultrasonic apparatus which is fixed on the inner wall of the vessel body and deep into the cavity of the vessel shell. When the energy of the water bath ultrasonic generation apparatus is insufficient to meet requirements, the probe ultrasonic generation apparatus having larger energy density will be qualified. Further, the probe ultrasonic generation apparatus is disposed inside the semi-closed material-restricting zone.

Furthermore, the solid-liquid phase reactor further includes a heating apparatus. The heating apparatus is in connection with the reaction vessel body or in direct contact with the reaction solution. The heating apparatus controls temperatures of the reaction solution and a reaction system.

Furthermore, the solid-liquid phase reactor further includes a stirring apparatus. The stirring apparatus includes a mechanical stirring apparatus or an electromagnetic stirring apparatus. The mechanical stirring apparatus is fixed on the inner wall of the vessel shell and run deep into the cavity of the vessel shell to be in contact with the reaction solution. The electromagnetic stirring apparatus is located at the bottom of the vessel.

Furthermore, the stirring apparatus is located outside the semi-closed material-restricting zone and is in contact with the reaction solution outside the semi-closed material-restricting zone.

Furthermore, the stirring apparatus is disposed inside and outside the semi-closed material-restricting zone respectively.

Furthermore, the solid-liquid phase reactor further includes an acid-alkali concentration detection apparatus which is fixed on the inner wall of the vessel body and run deep into the cavity of the vessel shell to be in contact with the reaction solution or unfixedly floats on a liquid surface of the reaction solution or suspends in the reaction solution.

The acid-alkali concentration detection apparatuses at different positions can detect the concentrations of the reaction solution at different positions in the reaction vessel to obtain a distribution feature of the concentration of the reaction solution in the vessel as guidance for optimization of reaction process.

Furthermore, the solid-liquid phase reactor further includes an intelligent control system, which is in electrical connection with the acid-alkali concentration detection apparatus, a solid reactant charge opening switch and a reaction solution make-up opening switch. Based on the distribution feature of the concentration of the reaction solution in the vessel obtained by the acid-alkali concentration detection apparatus, a charge amount and an injection amount of the solid reactant and the reaction solution and their charge and injection times can be controlled.

Furthermore, the solid-liquid phase reactor further includes a magnetic powder collection apparatus which is unfixedly disposed inside the vessel.

Furthermore, the magnetism of the magnetic powder collection apparatus is electrically controlled. When the reaction product contains a magnetic powder, the magnetic powder collection apparatus may be electrically controlled to be magnetized. When the magnetic powder is to be put down, the magnetic powder collection apparatus may be powered off to be demagnetized.

Furthermore, the material-restricting partition net is provided with a hole unclogging apparatus. When the material-restricting partition net is clogged and cannot be unclogged by ultrasonication, the hole unclogging apparatus may be used to unclog the holes of the partition net.

Furthermore, the hole unclogging apparatus includes a brush movable on the material-restricting partition net. The holes of the partition net can be unclogged by a mechanical force generated by movement of the brush.

The present disclosure has the following major beneficial effects.

A semi-closed material-restricting zone is formed by disposing a material-restricting partition net inside the reaction vessel, the solid reactant charge opening is in communication with the upwards-facing opening of the semi-closed material-restricting zone, and the reaction solution make-up opening is in communication with the internal space of the semi-closed material-restricting zone. In this way, the solid reactant or solid intermediate product is restricted within the semi-closed material-restricting zone. Thus, the concentration of the reaction solution where the particle size is larger is higher; and the concentration of the reaction solution where the particle size of the solid intermediate product is smaller is lower.

Due to presence of the concentration gradient of the reaction solution, the solid product prepared can reach a nano-level, or when the solid product reacts easily with the reaction solution with higher concentration, it can be guaranteed that the process in which small-granule intermediate product outside the semi-closed material-restricting zone changes into product proceeds in an environment with a reduced concentration of the reaction solution, and the solid product generated outside the semi-closed material-restricting zone is protected from being further consumed for further reaction with the reaction solution with higher concentration. Without disposal of the material-restricting partition net, the concentration of the reaction solution in contact with the reaction product generated earliest is same as the concentration of the reaction solution in contact with the solid reactant starting reaction, which is unfavorable for accurate control of morphology and performance of the reaction product.

By disposing a multi-level material-restricting partition net, continuous production can be further achieved, that is, the charge opening charges material continuously, different intermediate products are reacted in different material-restricting zones and the products finally obtained can be continuously collected.

BRIEF DESCRIPTIONS OF THE DRAWINGS

DETAILED DESCRIPTIONS OF EMBODIMENTS

The solid-liquid phase reactor for preparing a powder product will be further elaborated in combination with the following specific embodiments.

First Embodiment

Figure 1:
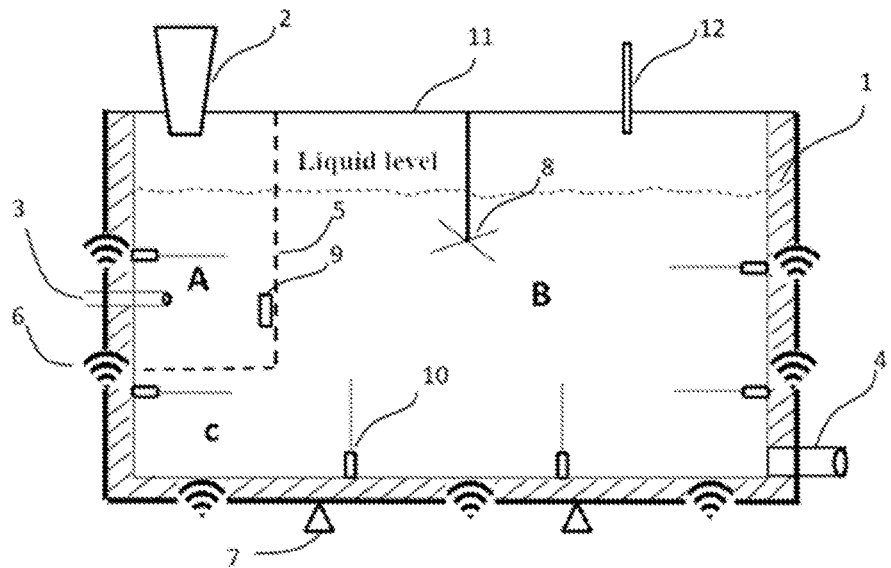
FIG. 1 is a structural schematic diagram illustrating a solid-liquid phase reactor for preparing a powder product according to a first embodiment.
Figure 2:
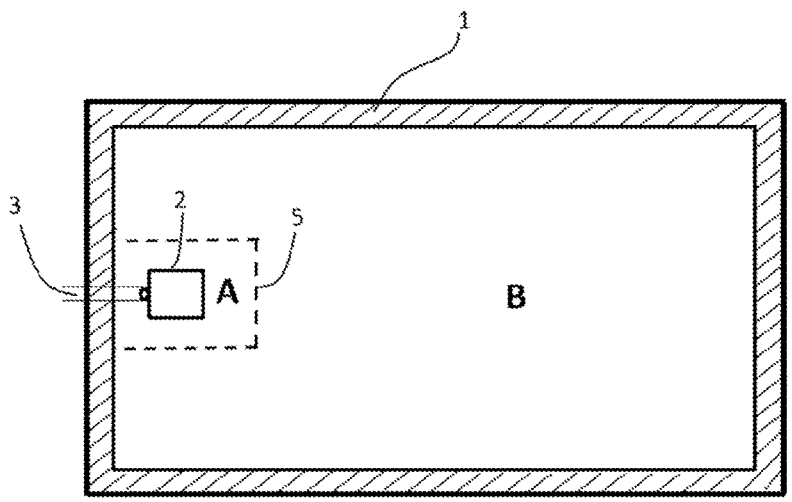
FIG. 2 is a top view of a structure of a positional relationship of a material-restricting partition net and a vessel body in a solid-liquid phase reactor for preparing a powder product according to a first embodiment (only showing a top view positional relationship of a material-restricting partition net, a solid reactant charge opening, a reaction solution make-up opening and a vessel body).

This embodiment provides a solid-liquid phase reactor for preparing a powder product. As shown in FIG. 1, the solid-liquid phase reactor includes a square cabinet-shaped vessel shell (consisting of a vessel body 1 and a vessel lid 11), a material-restricting partition net 5, a solid reactant charge opening 2, a reaction solution make-up opening 3 and an outlet 4. The material-restricting partition net 5 is fixed on an inner wall of the vessel body 1, and the material-restricting partition net 5 and one planar inner wall of the vessel body 1 are enclosed to form a semi-closed material-restricting zone A with an upwards-facing opening. The manner in which the material-restricting partition net 5 and the vessel body 1 are enclosed to form the semi-closed material-restricting zone A is shown in the top view shown in FIG. 2. A frame of the material-restricting partition net is a rigid structure to maintain a shape of the semi-closed material-restricting zone A. A capacity of the semi-closed material-restricting zone A is greater than 2 L and less than 10% of a total capacity of an internal space of a cavity of the vessel shell. A liquid level position is higher than a bottom position of the semi-closed material-restricting zone A, and a space c full of liquid is present under the semi-closed material-restricting zone A. The vessel lid 11 is provided with a reaction gas by-product collection channel 12 penetrating through the vessel lid. The solid reactant charge opening 2 and the reaction solution make-up opening 3 are in communication with a space of a zone A of the semi-closed material-restricting zone (as shown in FIG. 2). The outlet 4 is in communication with a space of a zone B outside the semi-closed material-restricting zone. An average particle size of a solid reactant>a hole size of holes of the material-restricting partition net>a particle size of a reaction powder product and at the same time, 250 µm≥the hole size of holes of the material-restricting partition net≥2 µm. A movable brush 9 is disposed on the material-restricting partition net 5 and the brush 9 may remove, by movement, the clogging by solid granules on the holes of the material-restricting partition net 5.

In this embodiment, the solid-liquid phase reactor further includes a water bath ultrasonic generation apparatus 6 disposed below an inner wall of the vessel body 1. A plurality of water bath ultrasonic generation apparatuses 6 are disposed in the inner wall of the reaction vessel body 1, for example, in a side wall and a bottom wall and the like of the vessel body 1. A water bath ultrasonic generation apparatus 6 is further disposed below the vessel inner wall at a position where the material-restricting partition net 5 is fixed.

In this embodiment, the solid-liquid phase reactor further includes a heating apparatus 7, where the heating apparatus 7 is in connection with the inner wall of the reaction vessel body 1.

In this embodiment, the solid-liquid phase reactor further includes a stirring apparatus 8. The stirring apparatus 8 is a mechanical stirring apparatus 8 which is fixed to the vessel lid 11 with its stirring part below the liquid level.

In this embodiment, the solid-liquid phase reactor further includes an acid-alkali concentration detection apparatus 10 which is fixed on the inner wall of the vessel body 1 and runs deep into the cavity of the vessel shell. The positions of the acid-alkali concentration detection apparatuses 10 may be in the zone A of the semi-closed material-restricting zone and the zone B outside the semi-closed material-restricting zone. A plurality of acid-alkali concentration detection apparatuses 10 are disposed on the inner wall of the reaction vessel body 1, for example, on the side wall and the bottom wall and the like, so as to monitor concentrations of a reaction solution at different positions, as shown in FIG. 1.

In this embodiment, the solid-liquid phase reactor further includes an intelligent control system, which is in electrical connection with the acid-alkali concentration detection apparatus 10, a solid reactant charge opening switch 2 and a reaction solution make-up opening switch 3. Based on a distribution feature of the concentration of the reaction solution in the vessel obtained by the acid-alkali concentration detection apparatus 10, a charge amount and an injection amount of the solid reactant and the reaction solution and their charge and injection times can be controlled.

Second Embodiment

Figure 3:
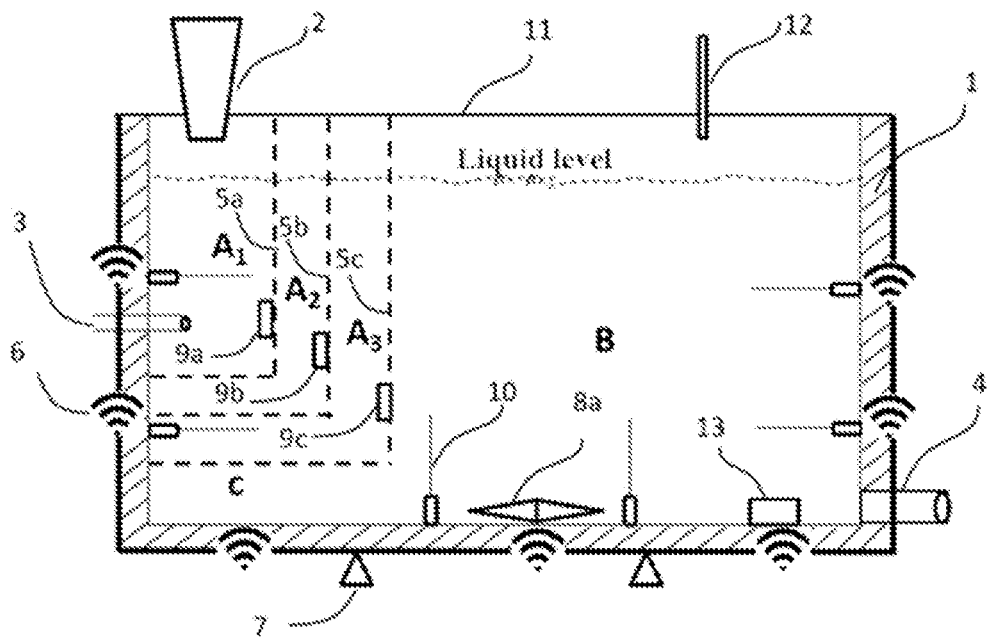
FIG. 3 is a structural schematic diagram illustrating a solid-liquid phase reactor for preparing a powder product according to a second embodiment.

This embodiment provides a solid-liquid phase reactor for preparing a powder product which is an improved solid-liquid phase reactor of the embodiment 1. As shown in FIG. 3, the solid-liquid phase reactor includes a square cabinet-shaped vessel shell (consisting of a vessel body 1 and a vessel lid 11), three layers of material-restricting partition nets (5a, 5b and 5c), a solid reactant charge opening 2, a reaction solution make-up opening 3, and an outlet 4. The three layers of material-restricting partition nets (5a, 5b and 5c) are fixed, as a canning structure, to one inner wall of the vessel body 1 in a manner similar to the embodiment 1 and enclosed to form semi-closed material-restricting zone $A_1$, zone $A_2$, and zone $A_3$ with an upwards-facing opening, together with one planar inner wall of the vessel body 1 respectively. Frames of the material-restricting partition nets are rigid structures to maintain the shapes of the semi-closed material-restricting zone $A_1$, zone $A_2$, and zone $A_3$. The semi-closed material-restricting zone $A_1$ has a capacity greater than 2 L and less than 10% of a total capacity of an internal space of a cavity of the vessel shell. An inter-net average distance of different layers of material-restricting partition nets exceeds 100 mm, and the position of the liquid level is higher than bottom positions of the semi-closed material-restricting zone $A_1$, zone $A_2$, and zone $A_3$, and a space c full of liquid is present under the bottoms of the semi-closed material-restricting zone $A_1$, zone $A_2$, and zone $A_3$.

The vessel lid 11 is provided with a reaction gas by-product collection channel 12 penetrating through the vessel lid. The solid reactant charge opening 2 and the reaction solution make-up opening 3 are in communication with a space of the semi-closed material-restricting zone $A_1$. The outlet 4 is in communication with a space of a zone B outside the semi-closed material-restricting zone $A_1$ and zone $A_2$, and zone $A_3$. The relationship of the holes sizes of the holes of the material-restricting partition nets is as follows: the average particle size of the solid reactant>the hole size of the holes of the material-restricting partition net 5a>the hole size of the holes of the material-restricting partition net 5b>the hole size of the holes of the material-restricting partition net 5c>the particle size of the reaction product powder; the three layers of material-restricting partition nets all satisfy: 250 µm≥the hole size of the holes of the material-restricting partition net≥2 µm.

Movable brushes (9a, 9b, and 9c) are respectively disposed on the three layers of material-restricting partition nets (5a, 5b and 5c), and the brushes (9a, 9b, and 9c) may remove, by movement, the clogging by solid granules on the holes of the material-restricting partition nets (5a, 5b and 5c) respectively.

In this embodiment, the solid-liquid phase reactor further includes a water bath ultrasonic generation apparatus 6 which is disposed below the inner wall of the vessel body 1. A plurality of water bath ultrasonic generation apparatuses 6 are disposed in the inner wall of the reaction vessel body 1, for example, in a side wall and a bottom wall and the like of the vessel body 1. Water bath ultrasonic generation apparatuses 6 are further disposed respectively below the vessel inner wall at positions where the material-restricting partition nets ($5a$, $5b$ and $5c$) are fixed.

In this embodiment, the solid-liquid phase reactor further includes a heating apparatus 7, where the heating apparatus 7 is in connection with the inner wall of the reaction vessel body 1.

In this embodiment, the solid-liquid phase reactor further includes a stirring apparatus 8. The stirring apparatus 8 is an electromagnetic stirring apparatus $8a$ which is located at but not fixed to the bottom of the vessel.

In this embodiment, the solid-liquid phase reactor further includes an acid-alkali concentration detection apparatus 10 which is fixed on the inner wall of the vessel body 1 and runs deep into the cavity of the vessel shell. The positions of the acid-alkali concentration detection apparatuses 10 may be in the semi-closed material-restricting zone $A_1$ and zone $A_2$, zone $A_3$ and the zone B outside the semi-closed material-restricting zones. A plurality of acid-alkali concentration detection apparatuses 10 are disposed on the inner wall of the reaction vessel body 1, for example, on the side wall and the bottom wall and the like, so as to monitor concentrations of a reaction solution at different positions, as shown in FIG. 3.

In this embodiment, the solid-liquid phase reactor further includes a magnetic powder collection apparatus 13 which is disposed at but not fixed to the bottom of the vessel body 1. The magnetism of the magnetic powder collection apparatus 13 is electrically controlled. When the reaction product contains a magnetic powder, the magnetic powder collection apparatus 13 may be electrically controlled to be magnetized and collect the magnetic powder. When the magnetic powder is to be put down, the magnetic powder collection apparatus 13 may be powered off to be demagnetized.

Third Embodiment

Figure 4:
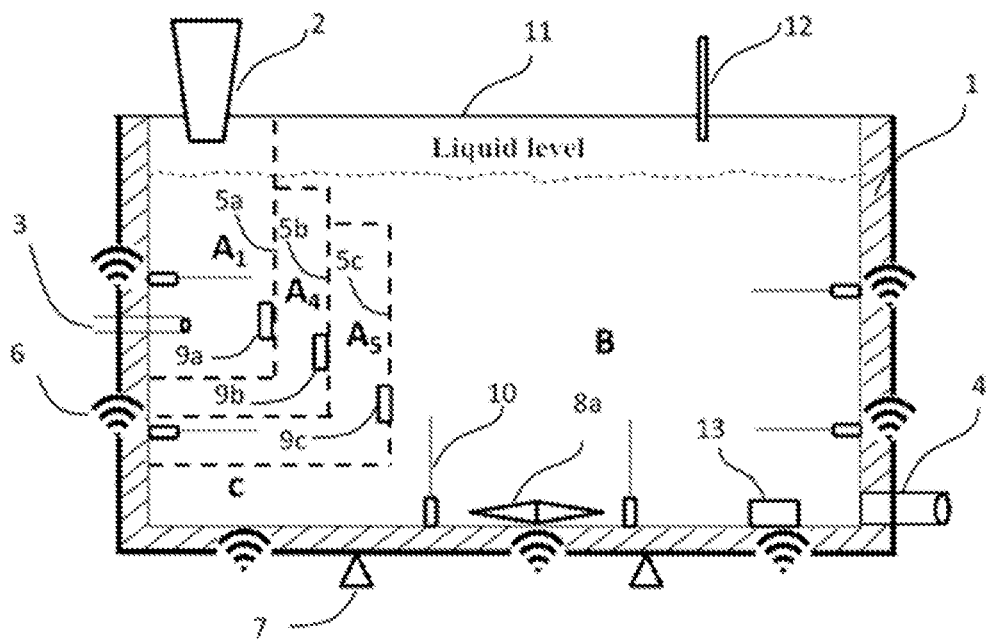
FIG. 4 is a structural schematic diagram illustrating a solid-liquid phase reactor for preparing a powder product according to a third embodiment.

This embodiment provides a solid-liquid phase reactor for preparing a powder product which is an improved solid-liquid phase reactor of the embodiment 2. As shown in FIG. 4, the sole difference of the embodiment 3 from the embodiment 2 is that except that the innermost layer of material-restricting zone $A_1$ is the semi-closed material-restricting zone $A_1$ with an upward-facing opening, other layers of material-restricting zones $A_4$ and $A_5$ are closed material-restricting zones without an opening.

The above descriptions are only made to the preferred embodiments of the present disclosure and the scope of protection of the present disclosure is not limited to these embodiments. Any technical solutions belonging to the idea of the present disclosure shall fall in the scope of protection of the present disclosure.

What is claimed is:

1. A solid-liquid phase reactor for preparing a powder product, comprising a vessel shell, a material-restricting partition net, a solid reactant charge opening, and a reaction solution make-up opening, wherein the material-restricting partition net is disposed in a cavity of the vessel shell and is connected to a vessel body of the vessel shell;

the material-restricting partition net is enclosed to form a semi-closed material-restricting zone with an upward-facing opening itself or together with an inner wall of the vessel body; a frame of the semi-closed material-restricting zone is rigid; the solid reactant charge opening is in communication with the upward facing opening of the semi-closed material-restricting zone, and the reaction solution make-up opening is in communication with an internal space of the semi-closed material-restricting zone;

further comprising an acid-alkali concentration detection apparatus which is fixed on the inner wall of the vessel body and runs into the cavity of the vessel shell to be in contact with the reaction solution or unfixedly floats on a liquid surface of the reaction solution or suspends in the reaction solution;

and further comprising an intelligent control system, which is in electrical connection with the acid-alkali concentration detection apparatus, a solid reactant charge opening switch and a reaction solution make-up opening switch.

2. The solid-liquid phase reactor of claim 1, wherein the material-restricting partition net is in the form of multiple layers, and enclosed to form a multi-level material-restricting zone itself or together with the inner wall of the vessel body.

3. The solid-liquid phase reactor of claim 1, wherein the vessel shell comprises a sealing vessel lid, and a reaction gas by-product collection channel penetrating through the vessel shell is disposed above a highest liquid level of the vessel shell.

4. The solid-liquid phase reactor of claim 1, wherein a ratio of a capacity of the semi-closed material-restricting zone to a capacity of an internal space of the cavity of the vessel shell is 0.2% to 25%, and the capacity of the semi-closed material-restricting zone is greater than 2 L.

5. The solid-liquid phase reactor of claim 1, wherein the semi-closed material-restricting zone is formed by connecting the material-restricting partition net to the inner wall of the vessel body.

6. The solid-liquid phase reactor of claim 1, wherein a space is present between the semi-closed material-restricting zone and a bottom of the vessel body.

7. The solid-liquid phase reactor of claim 1, wherein the material-restricting partition net comprises holes, and wherein the hole diameter of the holes of the material-restricting partition net satisfies: 250 µm≥the hole diameter of the holes of the material-restricting partition net≥2 µm.

8. The solid-liquid phase reactor of claim 1, wherein the material-restricting partition net comprises holes, and wherein a hole diameter of the holes of the material-restricting partition net satisfies: 30 µm≥the hole diameter of the holes of the material-restricting partition net≥2 µm.

9. The solid-liquid phase reactor of claim 1, wherein the reaction solution make-up opening has a plurality of inlets which are uniformly distributed in the internal space of the semi-closed material-restricting zone.

10. The solid-liquid phase reactor of claim 1, further comprising an ultrasonic generation apparatus that is a water bath ultrasonic apparatus or is a probe ultrasonic apparatus, wherein, when the ultrasonic generation apparatus is the water bath ultrasonic apparatus, the ultrasonic generation apparatus is disposed below the inner wall of the vessel body, and when the ultrasonic generation apparatus is the probe ultrasonic apparatus, the ultrasonic generation apparatus is disposed on the inner wall of the vessel body and below a liquid level in the cavity of the vessel shell.

11. The solid-liquid phase reactor of claim 1, further comprising a heating apparatus, wherein the heating apparatus is in connection with the vessel body.

12. The solid-liquid phase reactor of claim 1, further comprising a stirring apparatus, wherein the stirring apparatus comprises a mechanical stirring apparatus or an electromagnetic stirring apparatus; the mechanical stirring apparatus is fixed on the inner wall of the vessel body and runs into the cavity of the vessel shell to be in contact with the reaction solution; the electromagnetic stirring apparatus is located at the bottom of the vessel body.

13. The solid-liquid phase reactor of claim 1, further comprising a magnetic powder collection apparatus which is unfixedly disposed inside the vessel shell.

14. The solid-liquid phase reactor of claim 1, wherein the material-restricting partition net is provided with a hole unclogging apparatus.

15. The solid-liquid phase reactor of claim 14, wherein the hole unclogging apparatus comprises a brush movable on the material-restricting partition net.

* * * * *